Jan. 17, 1967 N. M. RASKHODOFF 3,298,195

MODULE COOLING SYSTEM

Filed Oct. 15, 1965 3 Sheets-Sheet 1

INVENTOR
NICHOLAS M. RASKHODOFF

BY Melvin L. Crane AGENT

ATTORNEY

INVENTOR
NICHOLAS M. RASKHODOFF

BY Melvin L. Crane AGENT
[signature]
ATTORNEY

Jan. 17, 1967 N. M. RASKHODOFF 3,298,195

MODULE COOLING SYSTEM

Filed Oct. 15, 1965 3 Sheets-Sheet 3

INVENTOR
NICHOLAS M. RASKHODOFF

BY Melvin L. Crane AGENT

ATTORNEY

United States Patent Office 3,298,195
Patented Jan. 17, 1967

3,298,195
MODULE COOLING SYSTEM

Nicholas M. Raskhodoff, Cheverly, Md., assignor to the United States of America as represented by the Secretary of the Navy Filed Oct. 15, 1965, Ser. No. 496,727
6 Claims. (Cl. 62—414)

This application is a continuation-in-part of application Serial Number 421,129, filed December 24, 1964, for Module Cooling System, now Patent Number 3,224,221.

The invention described herein may be manufactured and used by or for the Government of the United States of America for governmental purposes without the payment of any royalties thereon or therefor.

The present invention is directed to a cooling system for module equipment cabinets which include a plurality of module racks therein and more particularly to a means for eliminating heat transfer between hot air and cold air sections of air conductor ducts in a cooling system which supplies circulating air to modules in a module rack whether the rack is in the cabinet or withdrawn from the cabinet such as for repairs.

Heretofore module equipment cabinets have been assembled wherein circulating air is directed across the module racks in vertical and horizontal planes for cross cooling of electrical equipment. Such a system furnishes cooling circulating air only when the module racks are assembled within the cabinets. There has been no available cooling system prior to the present invention which will furnish circulating air through modules in a module rack when the rack is within the cabinet or which has been withdrawn from the cabinet for repairs. The cooling system of the present invention is only made possible by approriately designing a cabinet within which a plurality of module racks are positioned upon which the modular assemblies are mounted.

In application Serial Number 421,129, filed December 24, 1964, air distribution within each individual air duct is not controlled as to the amount of air available at each module inlet. It has been determined that most air available at the module inlets furthest from the duct-air inlet gradually decreases in availability toward the duct air inlet and even has a vacuum or reverse flow developing at module inlets nearest to the duct air inlet. Therefore, the duct passages have been modified according to the present invention.

It is therefore an object of the present invention to provide a cabinet that is designed to provide sufficient ventilation for electrical components housed within the cabinet.

Another object is to provide a cabinet that admits fresh air through all levels of each rack within the cabinet for uniformly cooling electrical components mounted at different levels within the module racks.

Still another object is to provide a module cabinet wherein structural members are utilized as air ducts in such a manner as to provide sufficient circulation of fresh cooling air at all levels of the cabinet to sufficiently cool all electrical components mounted within each module.

Yet another object is to provide a cabinet in which fresh cooling air is supplied to a module rack even when the rack has been withdrawn from the cabinet.

A still further object is to provide separation between hot and cold air in a single duct in a module cooling system.

A still further object is to provide an air control means in a single or double duct in a module cooling system.

While still another object is to provide the cabinet with air vents which are isolated to prevent the loss of air when a module rack is withdrawn from the cabinet.

Other objects of this invention will become apparent from a more careful consideration of the following detailed description when taken together with the accompanying drawing in which.

The present invention is directed to an air cooling system in which the cabinet is functionally designed to provide cross ventilation or cross cooling of electrical components mounted within modular components at different levels in the cabinet. According to the basic concept of the present invention, cross ventilation is obtained by utilizing the cabinet structural members as air ducts which are connected with a bellows air intake that moves out and in with movement of the module rack. Fresh air is directed at different levels from an air duct formed by an upright support member of each module rack and is directed to cross members or ducts between which individual modules are secured. Each of the cross ducts are provided with an air separator which separates the coolant air from the hot air that has crossed over the electrical equipment and which provides insulation between the hot and cold air flow. The air is directed through the electrical components within modules wherein the air is then exhaused through an air outlet support member. If it is necessary to correct any trouble in a module rack, the module rack is withdrawn from the cabinet and held in place by a lock in a withdrawn position. The bellows hose is drawn out with the module rack and the air is directed through the modules and thus across the electrical components within the modules and is exhausted into the room through the outlet support member. Thus the system provides cooling air when the module racks are secured within the cabinet whereupon withdrawal of the module racks from the cabinet, air continues to be forced through the modules whether in the cabinet or not and when in the withdrawn position air is exhausted into the room. The support structure between the module stacks in the module racks is used for an air duct member such that each duct is an air inlet feed to the various electrical modules containing electrical components assembled within such modules and also provides an air outlet feed to the outlet system and to the air cooling means.

Figure 1:
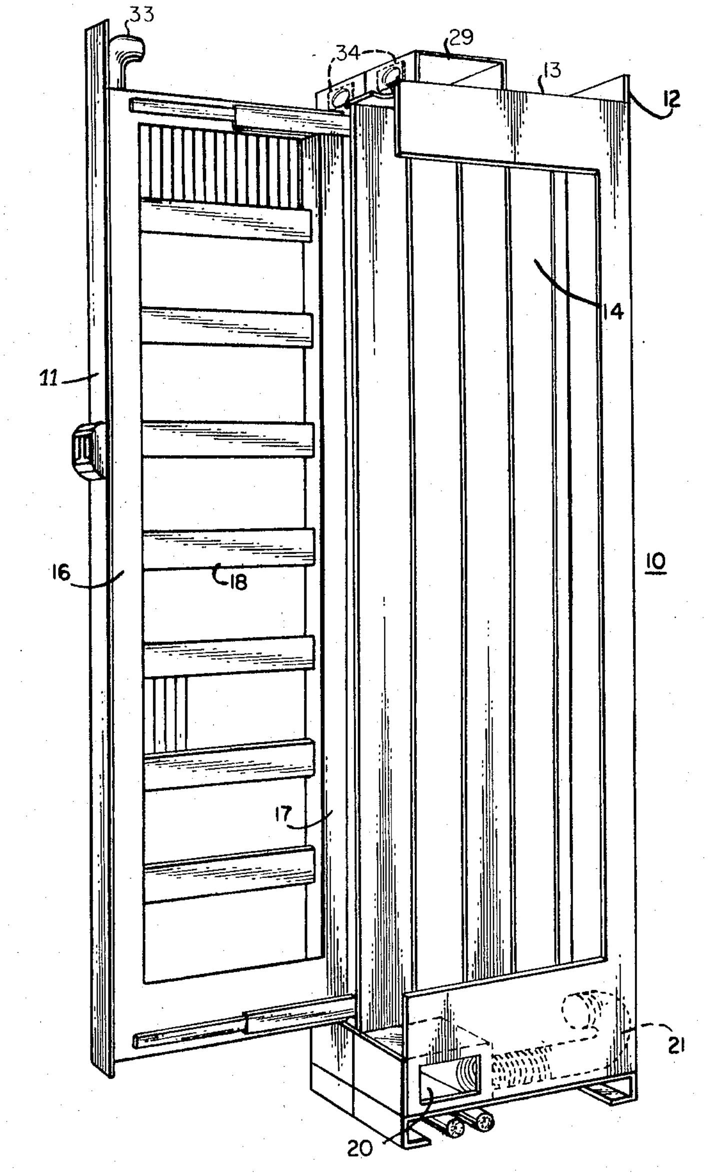
FIG. 1 illustrates a cabinet including a plurality of module racks illustrating several modules assembled on a rack shown in the open position.
Figure 2:
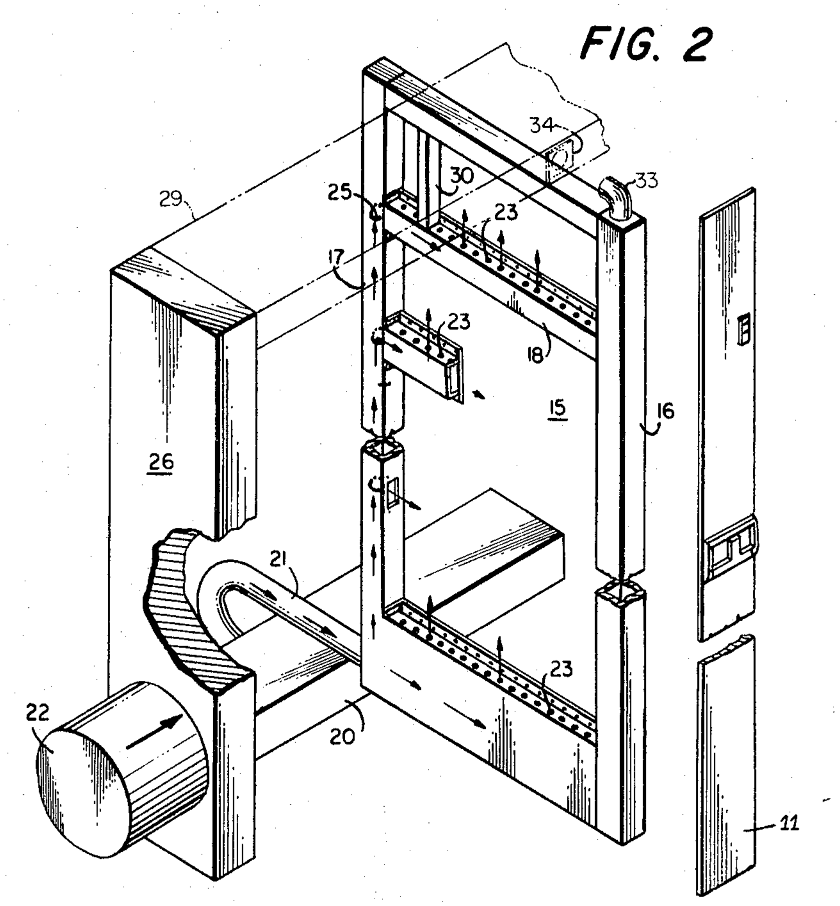
FIG. 2 illustrates a module rack and the air supply system through the modules.

Now referring to the drawings wherein like reference characters refer to like parts throughout the specification and drawings there is shown in FIG. 1 a partial portion of a cabinet for housing electrical equipment which is cooled by the cooling system of the present invention. A cabinet 10 is formed by end plates 11, a back plate 12, a top plate 13, and upright panels 14 which divide the cabinet into a plurality of compartments. The bottom of the upright panels are cut out in order to pass the electrical cables and power supply lines to the module rack as well as to house an air supply duct or manifold 20.

Each of the compartments receive therein a module rack 15 which is formed by vertically extending upright channels 16 and 17 interconnected by horizontal cross bars or ducts 18 which support the module housing or electrical components. The back vertically extending channel 17 is closed at the top and connects at the bottom to a bellows type hose 21 through which cooling air is forced by a blower 22. Each of the horizontal bars have spaced apertures 23 in the lower and upper surface thereof through which air is forced across the separate module units 24 and returned to the hot air exhaust channel 16. The vertically extending support passage 17 of the module rack is provided with a plurality of deflectors 25 one for each horizontal cross bar to deflect the air from the air supply channel to each of the horizontal support bars 18 of the module racks. Thus the framework of the module rack and the module supports are used to provide the channels through which coolant air is forced through the module elements.

Figure 4:
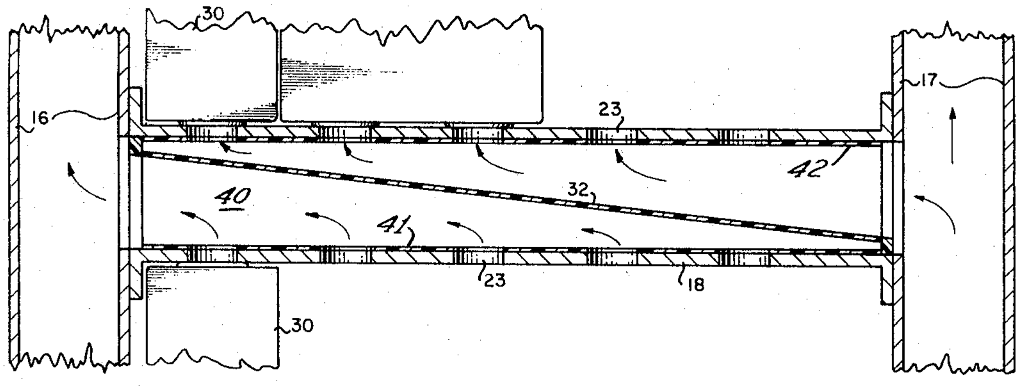
FIG. 4 illustrates a hot and cold air separation unit usable in a single air duct system.
Figure 6:
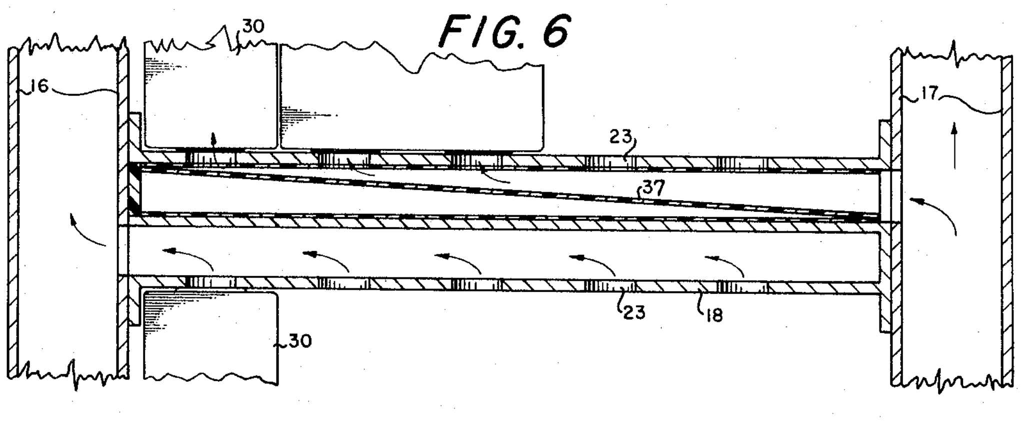
FIG. 6 illustrates an air flow control and air insulation means for a double duct air cooling system.

Each of the cross bars is provided with a separator 32 which separates the hot air return from the cold air feeder. The separator is made of a heat insulating material or provided with a heat insulating liner to prevent unnecessary heating of the coolant air. Since less air supply is needed farthest from the main upright supply feeder channel 17, and the greatest air return is adjacent to the hot air return channel, the separator wall between the hot and cold air in the cross duct is made on an angle, as shown in FIG. 4, the angular slope being upward away from the main fresh air supply channel. Thus the air is controlled somewhat. The divider may be made as a plastic insert 40 which is inserted into each of the horizontal single channels of the air cooling system described in application Serial Number 421,129, filed December 24, 1964. Each of the single channels and the plastic insert are provided with appropriate apertures in the lower and upper surfaces to permit air to enter the lower apertures while the air exits through the upper apertures to the modules. The lower surface 41 and the upper surface 42 of the plastic insert 40 provides thermal insulation for the channel to prevent additional heating of coolant air flowing through the cold air side of the insert. In a double channel air flow cross bar system as shown in FIG. 6, the coolant side of the cross bar is provided with a plastic insert to aid in controlling the air flow to the modules.

For the purpose of a more accurate control of the fresh air, an adjustable leaf spring may be included in the cold air side of a hot air-cold air combination duct. This duct may be made with a horizontal center separator wall with the leaf spring attached to the separator wall on the cold air side. The hot air return duct 29 returns the hot air to the cooler unit 26.

An air cooling unit 26 is provided with a suitable cooling surface such as cooling fins through which the hot air is drawn by a motor driven blower 22 and forced through the air supply duct or manifold 20 which crosses the bottom of the cabinet. The bellows type hose 21 is connected with the air supply manifold and to the upright support structure 17 of each of the separate module racks such that the upright structure distributes the air to the different modules. The upright 17 forms a part of the module rack and also serves to distribute the cooling air to the separate module racks. Each cross bar 18 that supports the module units connects with the upright end structure 17 and is in the form of a passage through which air may be conducted. Each of the cross bars having the spaced apertures in the upper surface thereof distributes the cooling air along the entire length of the cross bar and the air flows upwardly through the modules assembled on the module rack and is returned to the hot air upright 16 through the cross bar hot air side of the separator.

Each separate module rack is connected with a bellows type hose 21 that connects with the air supply manifold in order to supply fresh cooling air to each rack. The air is drawn over the cooling system such as refrigerator coils or any other cooling means and then directed through the supply duct along the bottom of the cabinet. The air is directed into each of the separate bellows hoses connected to the supply duct and to each of the separate module racks with one hose used for each module rack. The hose extends across the bottom of the rack and is pulled outwardly with the rack when the rack is withdrawn from the cabinet for changing a module or other repairs. The bellows type hose may be coated with a coating of polytetrafluoroethylene (Teflon) to protect the hose from wear and to permit the hose to slide easier.

Thus ventilation of the electrical components is obtained by utilizing the cabinet structural members and the module racks which feed the coolant air through each separate module of each separate module rack and exhaust the air into the hot air return vertical upright end support 16 and then back to the cooler through an appropriate return duct 29.

The upper end of the air return vertical upright end support 16 is provided with an adapter 33 that meets the return duct 29 to direct the hot return air into the return duct. The return duct is provided with a spring loaded door 34 that opens when the rack is in the closed position and which closes the opening in the return duct when the rack is in the open position for repairs or changing of a module for some reason.

The module racks are assembled within a compartment and glide on telescoping hangers at the top and the bottom so that they can be withdrawn from the compartment in order to work on any of the modules. Each of the module racks is provided with a front plate which closes the compartment when the rack is locked within its compartment. The front plates of each of the module racks have a close fit with each other such that there is a neat appearance from the front. Each module rack is locked in either of two positions, completely within the compartment or with the back portion thereof secured at the front of the cabinet in order to work on any of the modules.

Figure 3:
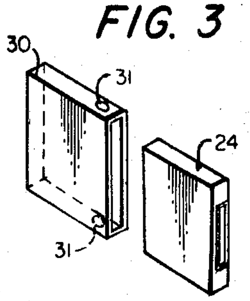
FIG. 3 illustrates a module can with a module assembly such as shown in position in the module rack of FIG. 2.

FIG. 3 illustrates a module can 30 having openings 31 at the bottom and top through which air passes from the horizontal support 18 through the module 24 and out through openings at the top of the can to the hot air return. These modules can be of different widths such that one module rack is positioned over each of the air supply vents 23 or the module may have a width to include several of the air supply vents 23.

FIG. 4 illustrates a section through one of the cross bars or ducts which illustrates the cold and hot air separator of the ducts.

Figure 5:
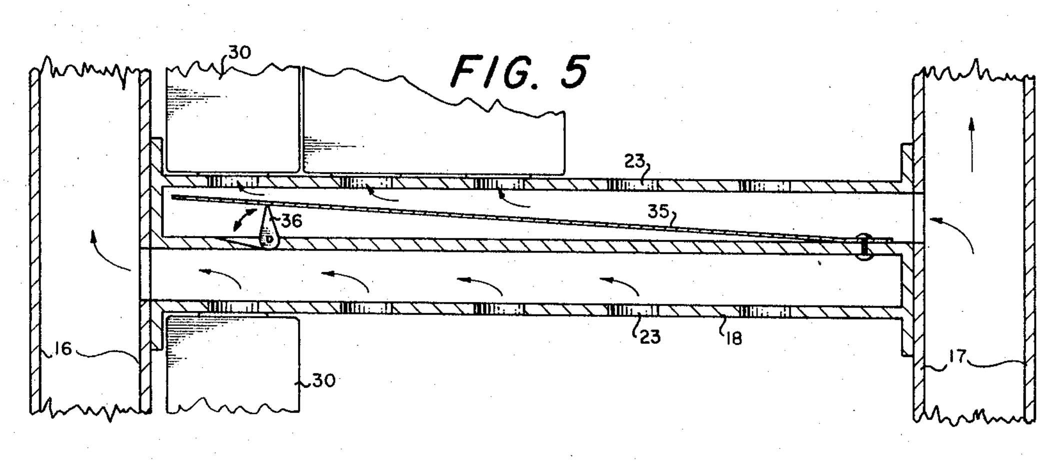
FIG. 5 illustrates a hot and cold air separation unit having an adjustable air flow control for a double air duct system.

FIG. 5 is a modification of the air duct as shown in FIG. 4. In this modification, the hot and cold air sections of the cross duct are of equal rectangular sections. The cold air section has a leaf spring 35 on the bottom thereof which is adjustable by any suitable means such as a lift 36 to provide a smaller air supply at the end away from the air feed inlet. Thus the air flow can be adjusted in case the modules at either end begin to get hotter than at the opposite end. In this modification, the coolant air flow can be controlled to provide a specific flow across the rack.

Some air systems are made with a dual duct, one for coolant air and one for the return hot air. It has been determined that the coolant air does not flow as needed in a straight wall channel; therefore, an insert such as shown in FIG. 6 has been provided in the coolant air side of the duct. As shown, the insert has a sloping partition 37 which constricts the air at the end away from the air supply duct. This structure is the same as the insert for a single channel duct which is converted to a dual channel duct except there are no air inlet apertures in the bottom section.

Thus the air will be forced from the air supply blower through the air supply duct to the air supply bellows type hose up through the end supports 17 to each of the horizontal support cross bars. The air passes through the vents or apertures 23 up through the modules and out through the openings at the top of the module can into the hot air return of the cross bar, then to air return 16. Thus it can be seen that the air is supplied to the modules whether the module racks are closed within the supporting housing or whether the racks are withdrawn for servicing.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A cooling system for supplying cooling air to electrical equipment housed in separate racks of a cabinet which comprises:

an air cooling means, air supply and air return ducts in said cabinet leading from said air cooling means and extending across said cabinet containing said electrical equipment to be cooled, a plurality of racks upon which said electrical equipment is assembled in individual modules, each of said racks including oppositely disposed first and second vertically extending hollow end members and an upper and lower horizontal hollow member separated by a plurality of spaced horizontal hollow members connected with said first and second vertically extending hollow members, said first vertically extending hollow end member providing an air supply to each of said plurality of spaced horizontal hollow members and to said lower horizontal hollow member, said second vertical hollow end member providing a hot air return from said plurality of spaced horizontal members and from said upper horizontal hollow member, each of said plurality of spaced horizontal hollow members including apertures in their upper and lower surfaces, a divider within each of said spaced horizontal members separating each of said members into upper and lower air flow channels, said lower horizontal hollow member and each of said upper flow channels of said plurality of spaced horizontal hollow members connecting with said first vertically extending member to supply air through said apertures in the upper surface thereof, said upper horizontal hollow member and said lower air flow channel of each of said plurality of horizontal hollow members being connected with said second vertically extending end member to return air to said air cooling means, a bellows type hose connected between said air duct extending across said cabinet and each of said first vertically extending end members of each of said racks to supply cool air thereto, whereby cool air is supplied through said first vertically extending end member to said plurality of horizontal hollow members, across the electrical equipment modules, out through the lower air flow channel of each of said plurality of horizontal members and the upper horizontal hollow member and out through said second vertically extending end member of each of said racks to the air cooling means through a return duct.

2. A cooling system as claimed in claim 1 wherein:

said divider in each of said horizontal hollow members is at an angle to the linear axis thereof with the angular slope being upward from the air inlet end.

3. A cooling system as claimed in claim 2 wherein:

said divider is a sleeve adapted to fit into a single air flow channel to form a double air flow channel in each of said horizontal hollow members.

4. A cooling system as claimed in claim 1 wherein:

said upper air flow channel of each of said horizontal hollow members includes a sleeve therein, said sleeve having a sloping partition in which the slope is upward away from the air supply inlet of said horizontal member.

5. A cooling system as claimed in claim 1 wherein:

said upper air flow channel in each of said horizontal hollow members includes an adjustable leaf spring adapted to adjust the air flow through each of the upper air flow channels.

6. A cooling system as claimed in claim 1 wherein:

said cold and hot air horizontal channels are thermally insulated to prevent additional heating of the coolant air.

References Cited by the Examiner

UNITED STATES PATENTS

| | | | |
|---|---|---|---|
| 1,835,085 | 12/1931 | Robson | 62—418 |
| 2,013,264 | 9/1935 | Buder | 62—418 |
| 2,198,239 | 4/1940 | Baird | 62—418 |
| 2,788,641 | 4/1957 | Franklin | 62—414 |
| 2,843,806 | 7/1958 | O'Neill | 174—15 |
| 2,935,925 | 5/1960 | D'Ooge | 98—36 |
| 2,942,856 | 6/1960 | Woodward | 165—47 |
| 3,057,672 | 10/1962 | Morita | 312—330 |
| 3,123,743 | 3/1964 | Perlmutter | 174—15 |
| 3,147,403 | 9/1964 | Cressman | 174—16 |

WILLIAM J. WYE, *Primary Examiner.*